(12) United States Patent
Bosch

(10) Patent No.: US 8,439,126 B2
(45) Date of Patent: May 14, 2013

(54) ELECTRIC TOOL

(75) Inventor: Volker Bosch, Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 410 days.

(21) Appl. No.: 12/746,704

(22) PCT Filed: Oct. 15, 2008

(86) PCT No.: PCT/EP2008/063855
§ 371 (c)(1),
(2), (4) Date: Jun. 7, 2010

(87) PCT Pub. No.: WO2009/071378
PCT Pub. Date: Jun. 11, 2009

(65) Prior Publication Data
US 2010/0263895 A1  Oct. 21, 2010

(30) Foreign Application Priority Data

Dec. 6, 2007  (DE) .......................... 10 2007 055 718

(51) Int. Cl.
*B25F 5/00* (2006.01)
(52) U.S. Cl.
USPC .............. 173/2; 173/176; 173/217; 318/434; 388/804
(58) Field of Classification Search ................. 173/2, 4, 173/5, 11, 176, 217; 81/467, 469; 388/930, 388/937, 804; 318/432, 434, 139, 254
See application file for complete search history.

(56) References Cited

U.S. PATENT DOCUMENTS

| | | | |
|---|---|---|---|
| 3,757,194 A | 9/1973 | Weber et al. | |
| 4,574,225 A * | 3/1986 | Pershall et al. | 318/400.26 |
| 4,835,410 A | 5/1989 | Bhagwat et al. | |
| 5,715,156 A | 2/1998 | Yilmaz et al. | |
| 5,816,121 A | 10/1998 | Yshimizu et al. | |
| 5,838,877 A | 11/1998 | Elliot et al. | |
| 5,857,060 A | 1/1999 | Elliott et al. | |
| 5,955,794 A | 9/1999 | Schulz et al. | |
| 5,984,020 A | 11/1999 | Meyer et al. | |
| 6,204,649 B1 | 3/2001 | Roman | |
| 6,286,609 B1 * | 9/2001 | Carrier et al. | 173/1 |
| 6,834,730 B2 * | 12/2004 | Gass et al. | 173/2 |
| 7,088,066 B2 * | 8/2006 | Haller | 318/432 |
| 7,331,406 B2 * | 2/2008 | Wottreng et al. | 173/176 |
| 7,723,952 B2 * | 5/2010 | Phillips et al. | 320/114 |
| 2006/0140286 A1 | 6/2006 | Goto et al. | |
| 2006/0152263 A1 | 7/2006 | Rademacher | |
| 2007/0242489 A1 | 10/2007 | Chen | |

FOREIGN PATENT DOCUMENTS

| WO | 0169755 A1 | 9/2001 |
|---|---|---|
| WO | WO 01/69755 | 9/2001 |

OTHER PUBLICATIONS

Mihalic et al., "Conductive EMI Reduction in DC-DC Converter by Using the Randomized PWM", IEEE ISIE, Jun. 20, 2005, pp. 809-814, Dubrovnik, Croatia, XP-002517719.

(Continued)

*Primary Examiner* — Scott A. Smith
(74) *Attorney, Agent, or Firm* — Kenyon & Kenyon LLP

(57) ABSTRACT

The invention relates to a hand-guided electric tool having a motor and a pulse width modulator for generating a pulse width modulated signal for operating the motor. A unit is provided for reducing the EMC interferences emitted by the electric tool.

6 Claims, 4 Drawing Sheets

OTHER PUBLICATIONS

Mihalic et al., "Randomized PWM for Conductive EMI Reduction in DC-DC Choppers", Hait Journal of Science and Engineering B, vol. 2, No. 5-6, 2005, pp. 594-608, Maribor, Slovenia, XP-002517720.

AN 10496-Vacuum Cleaner with Philips P89LPC901, Publication date: Oct. 8, 2006. Rev. Aug. 1-10, 2006.

F. Mihalic and D. Kos: Conductive EMI Reduction in DC-DC Converters by Using the Randomized PWM IEEE ISIE, Jun. 20, 2005, p. 809-814, XP002517719, Dubrovnik, Croatia.

* cited by examiner

ELECTRIC TOOL

CROSS-REFERENCE TO RELATED APPLICATION

This application is a 35 USC 371 application of PCT/EP2008/063855 filed on Oct. 15, 2008.

BACKGROUND OF THE INVENTION

1. Field of the Invention

The present invention relates to a hand-held power tool.

2. Description of the Prior Art

Hand-held power tools such as drills, cordless screwdrivers, jigsaws, angle grinders, or electric hedge trimmers that are powered by batteries, rechargeable batteries, or a power cord are generally known. Power tools of this kind have electric motors, which, according to the prior art, are operated with a pulse width modulated voltage or, in the case of corded tools, by means of phase-angle control. As schematically depicted in FIG. 1, a pulse width modulated voltage periodically alternates between a high and low voltage value. When the high voltage value is present, the motor is switched on. When the low voltage is present, the motor is switched off. The ratio of the on-time $T_{on}$ during a period of pulse width modulated voltage to the total time $T_{PWM}$ of a period of pulse width modulated voltage is referred to as the mark/space ratio and determines the effective electrical output supplied by the motor.

One problem when using the pulse width modulation method is the production and emission of harmonics. Because of the periodic switching back and forth between a high and low voltage level and the resulting current changes, harmonics are produced whose frequency is an uneven multiple of the modulation frequency $f_{PWM}$ of the pulse width modulation (FIG. 2). These harmonics are emitted in the form of EMC interference. Excessively powerful EMC interference can negatively affect other electrical devices such as communication systems.

OBJECT AND SUMMARY OF THE INVENTION

The object of the present invention is to disclose a device that reduces the amplitudes of the EMC interference emitted by a hand-held power tool.

The object underlying the invention is attained by means of a power tool with the defining characteristics according to the invention.

In one embodiment of the invention, a hand-held power tool has a motor and a pulse width modulator for producing a pulse width modulated signal for operating the motor. According to the invention, the emitted EMC interference is reduced by using filter elements such as capacitors, chokes, and combinations thereof.

In another embodiment, the emitted interference is reduced by flattening or smoothing the edges of the pulse width modulated signal, which reduces the share of high-frequency signal components, i.e. harmonics.

In another embodiment of the invention, the carrier frequency of the pulse width modulated signal can be modulated using a noise signal or pseudorandom signal.

The pulse width modulated signal with a random-modulated carrier frequency advantageously has no discrete spectral lines with multiples of the carrier frequency of the pulse width modulation. Instead, each of these spectral lines is spread out over a frequency band. This distributes the total power of each high-frequency signal component over a frequency interval and as a result, the amplitudes of the individual signal maxima decrease.

In another embodiment, a clock pulse produced by a clock-pulse generator is modulated by a clock-pulse modulator using a noise signal or pseudorandom signal; the modulated clock signal is supplied to a pulse width modulator, which produces a pulse width modulated signal with a noise-modulated carrier frequency. The noise signal or pseudorandom signal can be produced by an analog noise generator. The noise signal or pseudorandom signal can also be produced as a digital pseudorandom number and converted into an analog pseudorandom signal by a smoothing element.

In a preferred embodiment of the invention, a microcontroller is provided as the pulse width modulator.

In another preferred embodiment, the modulation of the carrier frequency of the pulse width modulated signal is carried out digitally by a microcontroller using a noise signal or pseudorandom signal.

In this embodiment of the invention, the noise modulation of the carrier frequency of the pulse width modulated signal can be advantageously implemented entirely at the software level. As a result, no additional hardware components are required, incurring no increase in costs or in the assembly complexity required to manufacture the power tool.

BRIEF DESCRIPTION OF THE DRAWINGS

In the drawings, parts that are the same or function in the same manner have been provided with the same reference numerals. The invention is explained in greater detail below in conjunction with the accompanying drawings, in which.

DESCRIPTION OF THE PREFERRED EMBODIMENTS

Figure 1:
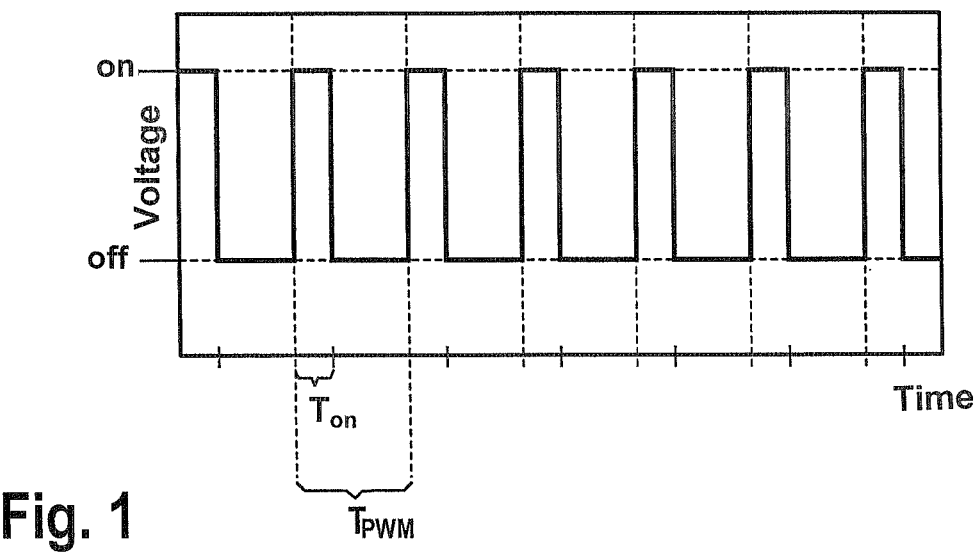
FIG. 1 schematically depicts a pulse width modulated voltage signal with a constant carrier frequency.

FIG. 1 is a schematic depiction of the variation in time of a pulse width modulated voltage signal. The pulse width modulated voltage signal periodically alternates between a high and low voltage value. If a motor of a power tool 100 (shown in FIG. 5, for example) is operated using a pulse width modulated voltage signal, then the voltage differences produce a chronological variation of the current flowing through the motor, but the inductance of the motor smoothes out this variance. Changes in the amperage produce a change in the torque and therefore the speed of the motor, but the inertia of the motor delays these changes. The two voltage levels alternate with each other at a carrier frequency $f_{PWM}$. The mark/ space ratio between the on-time $T_{on}$ and the total period duration $T_{PWM}$ influences the average output supplied by the motor of the power tool 100. With a sufficiently high carrier frequency $f_{PWM}$, a motor speed occurs that is virtually constant over time and is dependent on the mark/space ratio.

Figure 2:
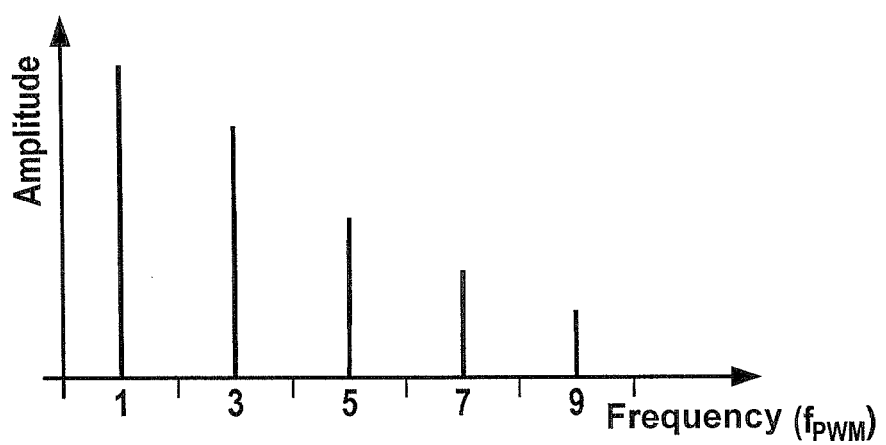
FIG. 2 schematically depicts an emitted spectrum of a pulse width modulated signal with a constant carrier frequency.

Because of the fixed carrier frequency $f_{PWM}$, the spectrum of the pulse width modulated voltage signal in FIG. 1 has a number of discrete spectral lines at uneven multiples of the modulation frequency $f_{PWM}$. This spectrum is schematically depicted in FIG. 2. The high-frequency signal components of the spectrum of the pulse width modulated signal and the resulting motor current are emitted in the form of EMC interference. The amplitudes of the individual discrete spectral lines in this case can exceed current or future permissible limit values.

One possibility for reducing EMC interference is to use filter elements such as capacitors, chokes, and combinations thereof. The use of additional components, however, increases the size of the power tool 100 and the assembly complexity required for its manufacture, thus incurring additional costs.

Another possibility for reducing the interference emitted by the pulse width modulation is to flatten or smooth the edges of the pulse width modulated signal. This reduces the share of high-frequency signal components, i.e. harmonics. A flattening of the signal edges can, for example, be achieved by the fact that the driver module that produces the pulse width modulated signal is intentionally embodied to be slower, for example through the insertion of a series resistance. However, doing so also protracts the switching time of a power switch situated after the driver module, thereby increasing switching losses. The power consumption of a power tool 100 increases as a result. This can negatively affect the running time of a power tool 100 powered by a battery or rechargeable battery.

Figure 3:
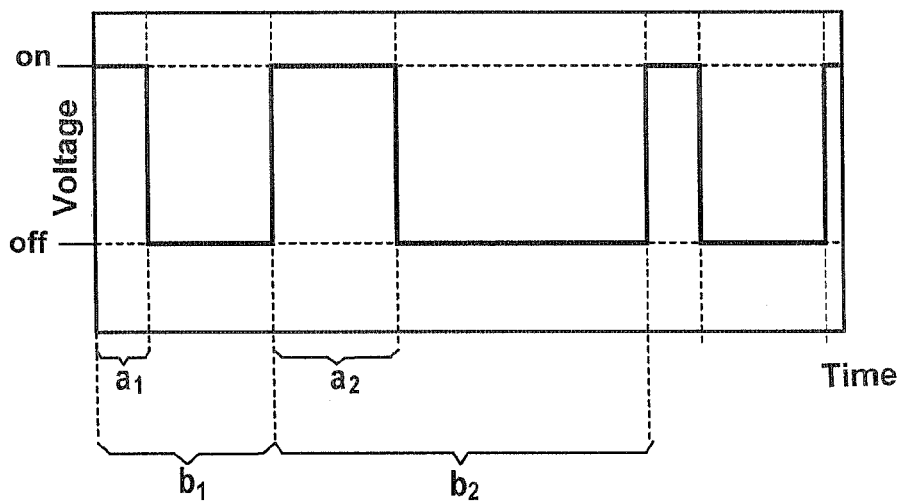
FIG. 3 schematically depicts a pulse width modulated voltage signal with a noise-modulated carrier frequency.
Figure 4:
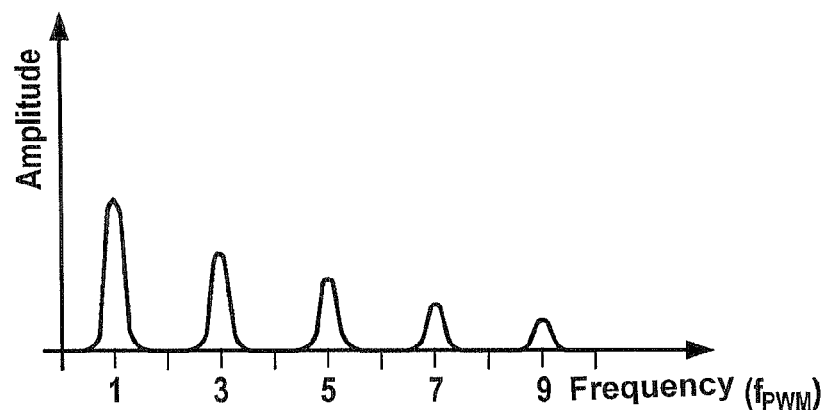
FIG. 4 schematically depicts an emitted spectrum of a pulse width modulated signal with a noise-modulated carrier frequency.

Another possibility for reducing the emitted EMC interference is to reduce the amplitudes of the harmonics of the pulse width modulated signal by using a noise signal or pseudorandom signal to modulate the carrier frequency of the pulse width modulated signal. This is schematically depicted in FIG. 3. FIG. 3 shows the variation in time of a pulse width modulated voltage signal with a noise-modulated carrier frequency. The voltage alternates between a high and low voltage level over time. The period $b_1$, $b_2$ of a cycle composed of a high and low voltage signal is subjected to a chronologically random modulation, which is depicted in exaggerated fashion in FIG. 3. The mark/space ratio of the on-time $a_1$, $a_2$ to the total duration of a cycle $b_1$, $b_2$, however, is constant over time. FIG. 4 schematically depicts the harmonic spectrum of such a pulse width modulated voltage signal with a noise-modulated carrier frequency. Instead of discrete spectral lines, the spectrum has amplitudes, which are expanded over finite frequency intervals by uneven multiples of the carrier frequency $f_{PWM}$ and whose height is reduced in comparison to the amplitudes of the spectrum in FIG. 2. A motor of a power tool 100 operated with a pulse width modulated voltage signal with a noise-modulated carrier frequency as shown in FIG. 3 therefore emits only reduced-amplitude EMC interference.

Figure 5:
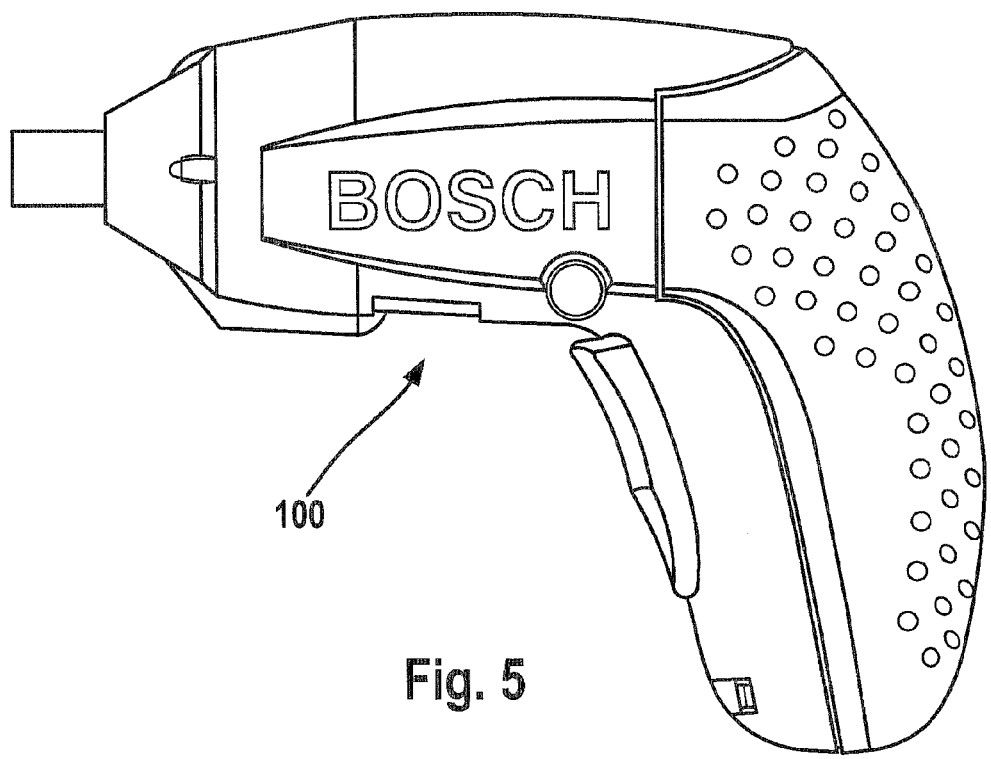
FIG. 5 schematically depicts a hand-held power tool.

FIG. 5 is a schematic view of a hand-held power tool 100.

Figure 6:
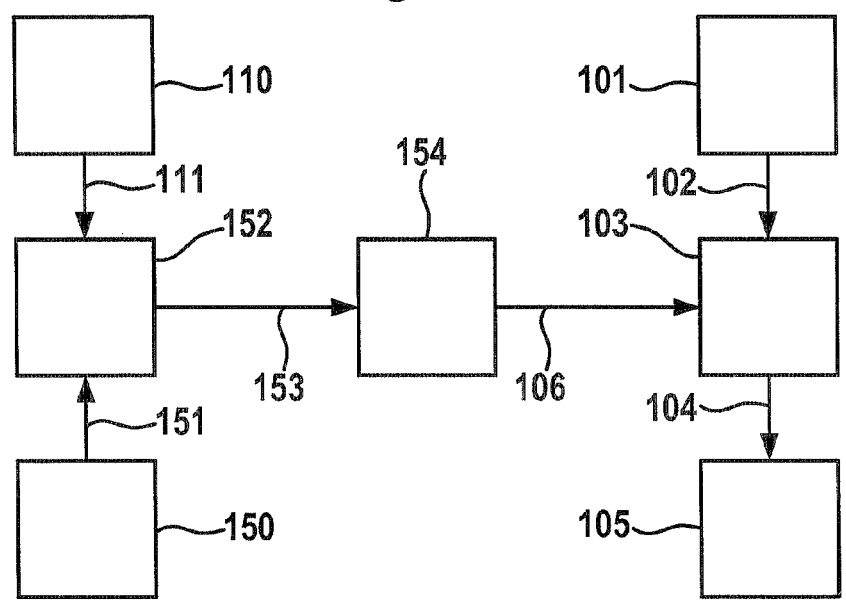
FIG. 6 schematically depicts a device for producing a pulse width modulated signal with a noise-modulated carrier frequency in a power tool.

FIG. 6 shows a part of a first embodiment of a power tool 100 according to the invention. The power tool 100 has a clock-pulse generator 110 that produces a constant clock pulse 111. An analog noise generator 150 emits an analog random signal 151. A clock-pulse modulator 152 modulates the constant clock pulse 111 using the analog random signal 151 to produce a modulated clock signal 153. In a preferred embodiment, the clock-pulse generator 110 and clock-pulse modulator 152 are combined to form a single unit. The modulated clock signal 153 is supplied to a pulse width modulator 154, which uses it to produce a pulse width modulated set point voltage with a noise-modulated carrier frequency 106. For example, the pulse width modulator 154 can be implemented in the form of a microcontroller. A voltage source 101 emits a constant voltage 102. The voltage source 101 can, for example, be a rechargeable battery built into the power tool 100 or a battery that is inserted into the power tool 100. A power switch 103 uses the constant voltage 102 and the pulse width modulated set point voltage with a noise-modulated carrier frequency 106 to produce a voltage 104 that has the same pulse width modulation with a noise-modulated carrier frequency as the pulse width modulated set point voltage with a noise-modulated carrier frequency 106. The pulse width modulated voltage with a noise-modulated carrier frequency 104 is supplied to a motor 105 of the power tool 100. The rotation speed of the motor 105 is determined by the mark/space ratio of the pulse width modulation produced by the pulse width modulator 154. Components required for this, e.g. switches and set point transmitters, are not shown in FIG. 6 for the sake of clarity. The power switch 103 can be a semiconductor element such as a MOSFET.

Figure 7:
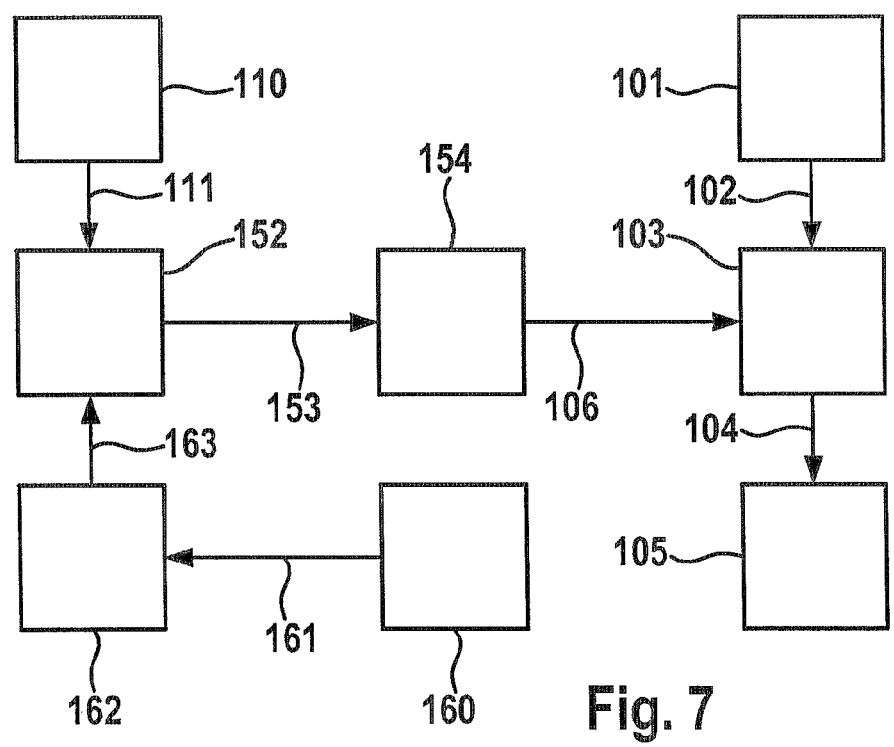
FIG. 7 schematically depicts another device for producing a pulse width modulated signal with a noise-modulated carrier frequency in a power tool.

FIG. 7 shows a part of a second embodiment of a power tool 100 according to the invention. The power tool 100 has a clock-pulse generator 110 that produces a constant clock pulse 111. A digital pseudorandom number generator 160 generates a digital pseudorandom number 161. The digital pseudorandom number generator 160 can, for example, be a microcontroller, which uses a suitable algorithm to generate a digital pseudorandom number 161 and serially transmits it bitwise via a port pin. A smoothing element 162 converts the digital pseudorandom number 161 into an analog pseudorandom signal 163. The smoothing element 162 can, for example, be an RC low pass. A clock-pulse modulator 152 uses the analog pseudorandom signal 163 to modulate the constant clock pulse 111, transforming it into a modulated clock signal 153. In a preferred embodiment, the clock-pulse generator 110 and clock-pulse modulator 152 are combined to form a single unit. The modulated clock signal 153 is supplied to a pulse width modulator 154, which produces a pulse width modulated set point voltage with a noise-modulated carrier frequency 106. A voltage source 101 integrated into the power tool 100 emits a constant voltage 102. A power switch 103 uses the constant voltage 102 and the pulse width modulated set point voltage with a noise-modulated carrier frequency 106 to produce a pulse width modulated voltage with a noise-modulated carrier frequency 104, which drives a motor 105 of the power tool 100.

Figure 8:
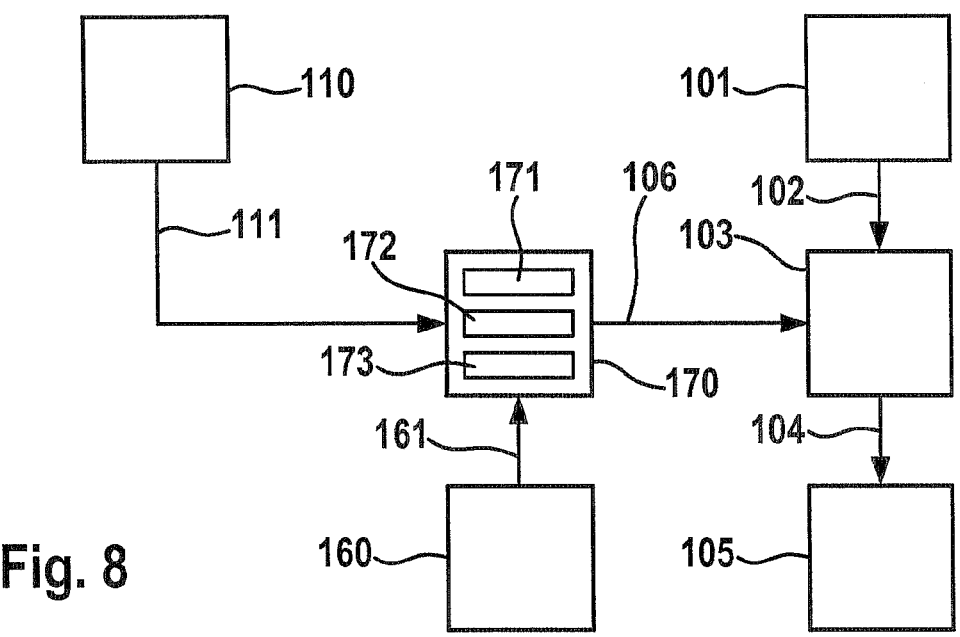
FIG. 8 schematically depicts another device for producing a pulse width modulated signal with a noise-modulated carrier frequency in a power tool.

FIG. 8 shows a part of another embodiment of a power tool 100 according to the invention. The power tool 100 has a clock-pulse generator 110 that produces a constant clock pulse 111. A digital pseudorandom number generator 160 generates a digital pseudorandom number 161. A pulse width modulator 170 uses the constant clock pulse 111 and the digital pseudorandom number 161 in a method according to the invention to produce a pulse width modulated set point voltage with a noise-modulated carrier frequency 106. The pulse width modulator 170 can, for example, be a microcontroller.

The pulse width modulator 170 has a counter 171, a defined fold-back value 172, and a defined overflow value 173. The counter 171, the fold-back value 172, and the overflow value 173 can, for example, be embodied in the form of a memory register of the microcontroller. The pulse width modulator 170 increases the value of the counter 171 by the number 1 with each clock cycle of the constant clock pulse 111. If the value of the counter 171 is less than the fold-back value 172, then the pulse width modulator 170 emits a high voltage level as a set point voltage (a noise-modulated carrier frequency 106). If the value of the counter 171 is greater than or equal to the fold-back value 172, then the pulse width modulator 170 emits a low voltage level as a set point voltage (a noise-modulated carrier frequency 106). If the value of the counter 171 is less than the overflow value 173, then the pulse width modulator 170 waits for the next clock cycle of the constant clock pulse 111 in order to then repeat the above-described process, starting from the increase of the counter 171.

If the value of the counter 171 is equal to the overflow value 173, then the value of the counter 171 is reset to a starting value, for example the value 0. Otherwise, the fold-back value 172 and the overflow value 173 for the subsequent clock cycle of the pulse width modulated set point voltage are modulated with a noise-modulated carrier frequency 106. The overflow value 173 determines the period length of the carrier frequency of the pulse width modulated set point voltage with a noise-modulated carrier frequency 106. The ratio of the fold-back value 172 to the overflow value 173 yields the mark/space ratio of the pulse width modulated set point voltage with a noise-modulated carrier frequency 106 and should vary as little as possible between the individual clock cycles of the carrier frequency of the pulse width modulated set point voltage with a noise-modulated carrier frequency 106. Ideally, the fold-back value 172 and the overflow value 173 are therefore multiplied by the digital pseudorandom number 161. In an alternative embodiment of the power tool 100 according to the invention, the digital random number 161 is added to the fold-back value 172 and the overflow value 173. This embodiment has the advantage that it is less computationally demanding for the pulse width modulator 170 to execute an addition than to execute a multiplication. If the value of the digital random number 161 is small compared to the fold-back value 172, then the resulting variation of the mark/space ratio of the pulse width modulated set point voltage with a noise-modulated carrier frequency 106 is negligibly low and averages out over the course of time. In a particularly preferred embodiment, the pulse width modulator 170 has an additional register for storing a constant fold-back value and an additional register for storing a constant overflow value. The new fold-back value 172 and the new overflow value 173 are calculated in each new period of the carrier frequency of the pulse width modulated set point voltage with a noise-modulated carrier frequency 106, based on the constant fold-back value and overflow value stored in the additional registers. This prevents the overflow value 173 and the fold-back value 172 from deviating too far from their initial values over time.

A voltage source 101 integrated into the power tool 100 emits a constant voltage 102. A power switch 103 uses the constant voltage 102 and the pulse width modulated set point voltage with a noise-modulated carrier frequency 106 to produce a pulse width modulated voltage with a noise-modulated carrier frequency 104, which drives a motor 105 of the power tool 100.

The foregoing relates to the preferred exemplary embodiments of the invention, it being understood that other variants and embodiments thereof are possible within the spirit and scope of the invention, the latter being defined by the appended claims.

The invention claimed is:

1. A hand-held power tool comprising:
   a motor;
   a pulse width modulator for producing a pulse width modulated signal for operating the motor;
   a device for modulating a carrier frequency of the pulse width modulated signal with a noise signal or a pseudo-random signal, thereby reducing EMC interference emitted by the power tool; and
   a clock-pulse generator for producing a clock-pulse signal, the pulse width modulated signal being derived from the clock-pulse signal;
   wherein a counter register is provided for counting the elapsed clock cycles of the clock signal, a fold-back value register and an overflow value register are provided, and the pulse width modulator
      emits a first signal level if the value of the counter register is less than a fold-back value,
      emits a second signal level if the value of the counter register is equal to or greater than the fold-back value,
      sets the counter to a starting value if the value of the counter is equal to an overflow value,
      sets the fold-back value and overflow value to random new values if the value of the counter is equal to a previous overflow value, with the ratio of the new fold-back value to the new overflow value being essentially equal to the ratio of a previous fold-back value to the previous overflow value.

2. The power tool as recited in claim 1, wherein a device is provided for determining the random new values for the fold-back value and overflow value by multiplying fixed, predetermined values by a random number or by adding a random number to fixed, predetermined values.

3. The power tool as recited in claim 2, wherein it is possible for the power tool to be supplied with electrical energy from at least one battery or rechargeable battery.

4. The power tool as recited in claim 2, wherein a microcontroller is provided as the pulse width modulator.

5. The power tool as recited in claim 1, wherein it is possible for the power tool to be supplied with electrical energy from at least one battery or rechargeable battery.

6. The power tool as recited in claim 1, wherein a microcontroller is provided as the pulse width modulator.

* * * * *

UNITED STATES PATENT AND TRADEMARK OFFICE
CERTIFICATE OF CORRECTION

PATENT NO.        : 8,439,126 B2
APPLICATION NO.   : 12/746704
DATED             : May 14, 2013
INVENTOR(S)       : Volker Bosch Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 374 days.

Signed and Sealed this
Eighth Day of September, 2015

Michelle K. Lee
*Director of the United States Patent and Trademark Office*